United States Patent
Upadhyay

(10) Patent No.: US 8,963,393 B2
(45) Date of Patent: Feb. 24, 2015

(54) MAGNETIC THRUST BEARINGS

(71) Applicant: ABB Research Ltd., Zurich (CH)

(72) Inventor: Parag Upadhyay, Morrisville, NC (US)

(73) Assignee: ABB Research Ltd., Zurich (CH)

( * ) Notice: Subject to any disclaimer, the term of this patent is extended or adjusted under 35 U.S.C. 154(b) by 244 days.

(21) Appl. No.: 13/718,482

(22) Filed: Dec. 18, 2012

(65) Prior Publication Data

US 2014/0167543 A1 Jun. 19, 2014

(51) Int. Cl.
*H02K 7/09* (2006.01)

(52) U.S. Cl.
USPC ...................................................... 310/90.5

(58) Field of Classification Search
USPC ........................................ 310/90.5, 178, 181
See application file for complete search history.

(56) References Cited

U.S. PATENT DOCUMENTS

| | | | |
|---|---|---|---|
| 5,101,130 A | 3/1992 | Jayawant et al. | |
| 5,315,197 A * | 5/1994 | Meeks et al. ................. | 310/90.5 |
| 5,406,157 A | 4/1995 | New | |
| 5,543,673 A | 8/1996 | Katsumata | |
| 5,969,451 A | 10/1999 | Lyons et al. | |
| 6,268,673 B1 | 7/2001 | Shah | |
| 6,338,900 B1 | 1/2002 | Tada et al. | |
| 6,700,258 B2 | 3/2004 | McMullen et al. | |
| 6,781,269 B1 * | 8/2004 | Shimada ....................... | 310/90.5 |
| 7,285,887 B2 | 10/2007 | Shimada | |
| 8,102,088 B2 * | 1/2012 | Filatov ......................... | 310/90.5 |
| 8,482,174 B2 * | 7/2013 | Filatov ......................... | 310/90.5 |

FOREIGN PATENT DOCUMENTS

| | | |
|---|---|---|
| EP | 0344596 | 5/1989 |
| EP | 0344503 A2 | 12/1989 |
| EP | 1223357 | 7/2002 |
| EP | 1739319 A2 | 1/2007 |
| JP | 201185223 A | 4/2011 |
| WO | 9534763 | 12/1995 |
| WO | 9534763 A1 | 12/1995 |
| WO | 2011160103 | 12/2011 |

OTHER PUBLICATIONS

A. Daehnhardt, International Searching Authority (EPO), International Search Report and Written Opinion of the International Searching Authority for corresponding International Application No. PCT/US2013/075551, European Patent Office, mailed Apr. 4, 2014.
"Silicon Steels and Their Applications," Key to Metals Articles, www.keytometals.com/Articles/Art101.htm, printed Dec. 5, 2012.

* cited by examiner

*Primary Examiner* — Hanh Nguyen
(74) *Attorney, Agent, or Firm* — Steven W. Hudnut

(57) ABSTRACT

Rotating machines and magnetic thrust bearings therefor are disclosed. Magnetic thrust bearings may include a rotor core configured to extend coaxially around a shaft of a rotating machine, a non-magnetic element configured to be coaxially disposed on the shaft, and a stator comprising a stator core and a coil, both of which are configured to extend coaxially around the axis. The rotor core may include a substantially radially extending thrust face and a substantially axially extending peripheral surface. The non-magnetic element may radially space the thrust face from the shaft. The stator core may include a substantially radially extending first pole surface and a substantially axially extending second pole surface. The first pole surface may define an axial air gap with the thrust face, and the second pole surface may define a radial air gap with the peripheral surface.

20 Claims, 3 Drawing Sheets

MAGNETIC THRUST BEARINGS

FIELD OF THE DISCLOSURE

The present disclosure relates to magnetic bearings, and more particularly to magnetic thrust bearings.

BACKGROUND

Examples of magnetic thrust bearings are disclosed in U.S. Pat. Nos. 5,101,130; 5,315,197; 5,406,157 and 6,700,258; in International Publication No. WO 95/34763 A1; and in European Patent Application Publication No. EP 0344596 A2. The disclosures of these and all other publications referenced herein are incorporated by reference in their entirety for all purposes.

SUMMARY

In some examples, magnetic thrust bearings may include a rotor core configured to extend coaxially around a shaft of a rotating machine, a non-magnetic element configured to be coaxially disposed on the shaft, and a stator comprising a stator core and a coil, both of which are configured to extend coaxially around the axis of the shaft. The rotor core may include a substantially radially extending thrust face and a substantially axially extending peripheral surface. The non-magnetic element may radially space the thrust face from the shaft. The stator core may include a substantially radially extending first pole surface and a substantially axially extending second pole surface. The first pole surface may define an axial air gap with the thrust face, and the second pole surface may define a radial air gap with the peripheral surface.

In some examples, rotating machines may include a shaft having an exterior surface, a magnetic thrust bearing rotor core extending coaxially around the shaft, a magnetic thrust bearing stator comprising a coil and a stator core that both extend coaxially around the shaft, and a non-magnetic element disposed around the exterior surface of the shaft. The magnetic thrust bearing rotor core may include a radially extending thrust face and an axially extending peripheral surface. The stator core may include a radially extending pole surface and an axially extending pole surface. The radially extending pole surface may define an axial air gap with the thrust face, and the axially extending pole surface may define a radial air gap with the peripheral surface. The non-magnetic element may radially space the axial air gap from the exterior surface of the shaft.

DETAILED DESCRIPTION

Figure 1:
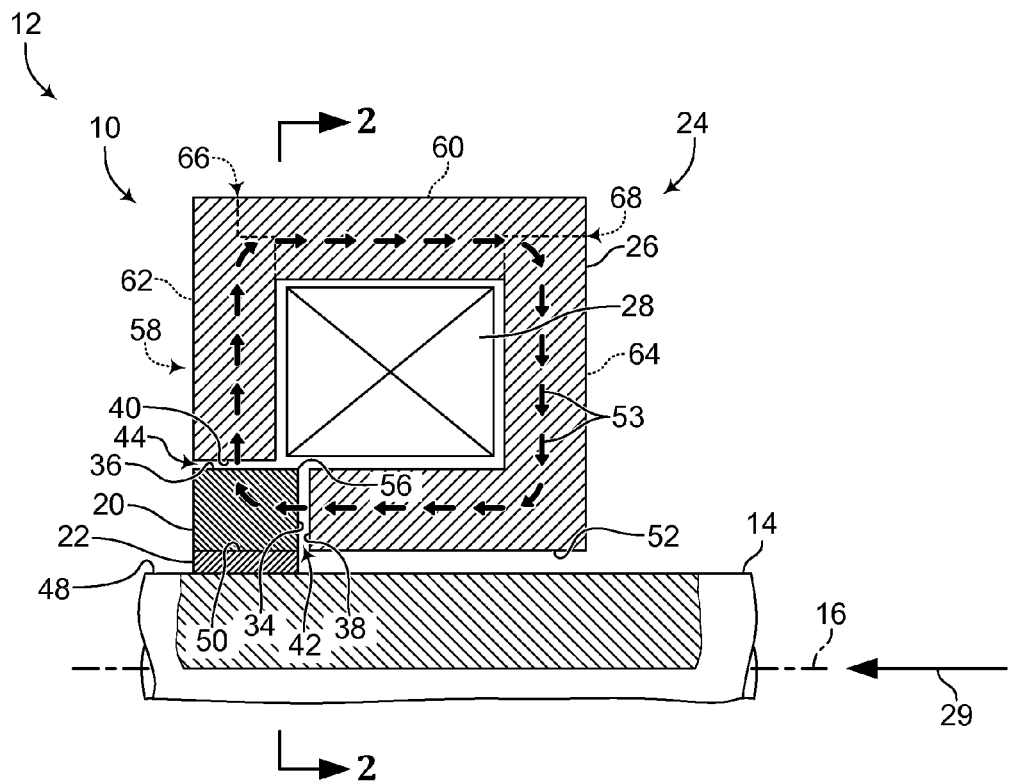
FIG. 1 is a longitudinal axial section view of a nonexclusive illustrative example of a magnetic thrust bearing for a rotating machine.

A nonexclusive illustrative example of a magnetic thrust bearing 10 for a rotating machine 12 having a shaft 14 extending along an axis 16 is shown in FIG. 1. Unless otherwise specified, the magnetic thrust bearing 10 may, but is not required to, contain at least one of the structures, components, functionalities, and/or variations described, illustrated, and/or incorporated herein. In the illustrated example, the magnetic thrust bearing 10 includes a rotor core 20, a non-magnetic element 22, and a stator 24 comprising a stator core 26 and a coil 28.

Nonexclusive illustrative examples of magnetic thrust bearings 10 may be used in suitable rotating machines 12, such as rotating machines or machinery in which axial or thrust loads or forces, as suggested by the arrow 29 in FIG. 1, are developed and/or need to be supported. Nonexclusive illustrative examples of suitable rotating machines include electric rotary machines and turbo-machinery, such as compressors and pumps. In some examples, such as with compressors and pumps, the static axial thrust forces generated within the rotating machine may be constant or may be proportional to rotational speed and, in some examples, may exceed the radial forces. As will be more fully explained below, the magnetic bearing 10 supports the thrust loads 29 by way of an axially directed electromagnetic attractive force acting on the rotor core 20.

Figure 2:
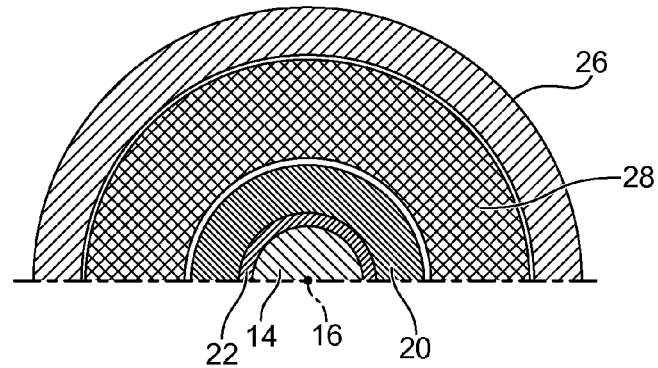
FIG. 2 is a cross section of the magnetic thrust bearing of FIG. 1, taken generally along line 2-2 in FIG. 1.

The rotor core 20 may be configured to extend coaxially around the axis 16 of the shaft 14. In some examples, such as is shown in FIG. 2, the rotor core 20 may include or be an annular structure that extends substantially completely circumferentially around the shaft 14. The rotor core 20 may have a substantially radially extending thrust face 34 and a substantially axially extending peripheral surface 36. In some examples, as shown in FIG. 1, the thrust face 34 may extend substantially normal or perpendicular to, or even perpendicular to, the axis 16, and the peripheral surface 36 may extend substantially parallel, or even parallel, to the axis 16. However, it is within the scope of this disclosure for the thrust face 34 to be other than perpendicular to the axis 16 and/or for the peripheral surface 36 to extend other than parallel to the axis 16. For example, either or both of the thrust face and peripheral surface may define a frustoconical surface that extends generally radially, for the thrust face, or generally axially, for the peripheral surface.

The stator core 26 and the coil 28 may both be configured to extend coaxially around the axis 16 of the shaft 14. In some examples, such as is shown in FIG. 2, the stator core 26 and/or the coil 28 may include or be annular structures that extend substantially completely circumferentially around the shaft 14.

The stator core 26 may include a substantially radially extending first pole surface 38 and a substantially axially extending second pole surface 40. The first pole surface 38 defines or forms an axial air gap 42 with the thrust face 34, and the second pole surface 40 defines or forms a radial air gap 44 with the peripheral surface 36. As may be understood, the first and second pole surfaces 38, 40 may be substantially parallel to, and/or equidistantly spaced from, the respective ones of the thrust face 34 and peripheral surface 36 of the rotor core 20. Accordingly, as shown in FIG. 1, the first pole surface 38 may extend substantially perpendicular, or even perpendicular, to the axis 16, and the second pole surface 40 may extend substantially parallel, or even parallel, to the axis 16.

The rotor core 20 and/or the stator core 26 may be fabricated from a suitable material, which may be or include a suitable ferromagnetic material, such as a magnetically soft or soft-magnetic material having a relatively low coercivity. Nonexclusive illustrative examples of a suitable soft-magnetic material for the rotor core 20 and/or the stator core 26 may include silicon electrical steels, such as the M270, M400 and other electrical steels specified by European Standard EN 10106, as well as soft magnetic composite materials, such as those comprising a powdered magnetic material dispersed within a polymer or other matrix material. The rotor core 20 and/or the stator core 26 may be fabricated from a single piece of material and/or from a plurality of layers or laminations.

The shaft 14 may be fabricated from any suitable material. As may be understood, some nonexclusive illustrative examples of the shaft 14 may include or be fabricated from a suitable ferromagnetic material. Nonexclusive illustrative examples of suitable ferromagnetic materials for the shaft 14 include cast iron and mild steels having a relative magnetic permeability in the range of about 60 to about 500.

The non-magnetic element 22 may be comprise an annular body, such as a spacer ring, that is configured to be coaxially disposed on or around the shaft 14, such as around the exterior surface 48 of the shaft. As shown in FIG. 1, the non-magnetic element 22 radially spaces or separates the thrust face 34 of the rotor core 20, and correspondingly the axial air gap 42, from the exterior surface 48 of the shaft 14. As may be understood, the non-magnetic element 22 may radially space or separate at least that portion of the rotor core 20 that includes the thrust face 34 away from the exterior surface 48 of the shaft 14. In the example illustrated in FIG. 1, the non-magnetic element 22 radially spaces and separates the entire rotor core 20 from the exterior surface 48 of the shaft 14. In some examples, the non-magnetic element 22 may be sized such that an axially extending outer surface 50 of the non-magnetic element 22 may be substantially radially aligned with an axially extending inner surface 52 of the stator core 26.

The non-magnetic element 22 may be fabricated from any suitable nonmagnetic material or combination of nonmagnetic materials. Nonexclusive illustrative examples of suitable nonmagnetic materials for the non-magnetic element 22 include aluminum and stainless steels. As may be understood, aluminum non-magnetic elements may be used in some nonexclusive illustrative examples where lighter weight is desirable, while stainless steel non-magnetic elements may be used in some nonexclusive illustrative examples to provide a non-magnetic element with a coefficient of thermal expansion (CTE) relatively similar to the CTE of the shaft and/or rotor material(s).

The non-magnetic element 22 and the rotor core 20 may be mounted or disposed on or around the exterior surface 48 of the shaft 14 using any suitable process, method or engagement. In some examples, the non-magnetic element 22 may be press-fit onto, over or around the shaft 14, such as where the non-magnetic element is located proximate an end of the shaft and/or the shaft include a region of reduced or tapering diameter between the location of the non-magnetic element and the end of the shaft. In some examples, the rotor core 20 may be press-fit onto, over or around the non-magnetic element 22, with the rotor core 20 being press-fit onto, over or around the non-magnetic element 22 optionally either before or after the non-magnetic element 22 is press-fit onto, over or around the shaft 14.

In some examples, the non-magnetic element 22 may be keyed to the shaft 14 or otherwise configured so as to prevent rotation of the non-magnetic element relative to the shaft. In some examples, the rotor core 20 may be keyed to the non-magnetic element 22 or otherwise configured so as to prevent rotation of the rotor core relative to the non-magnetic element.

In some examples, the rotor core 20, the non-magnetic element 22, and/or the exterior surface 48 of the shaft 14 may include one or more features, projections and/or recesses on their respective contact surfaces to prevent and/or impede axial relative movement between adjacent ones of the rotor core 20, the non-magnetic element 22, and/or the shaft 14. For example, the outer surface 50 of the non-magnetic element 22 may include a circumferential ridge or projection configured to prevent axial movement of the rotor core 20 relative to the non-magnetic element 22 in at least one direction.

The magnetic flux path for the magnetic thrust bearing 10 is schematically illustrated by the arrows 53 in FIG. 1. In the nonexclusive illustrative example illustrated in FIG. 1, the magnetic flux 53 enters the rotor core 20 across the axial air gap 42 and through the thrust face 34 and exits the rotor core through the peripheral surface 36 and across the radial air gap 44. In some examples, the magnetic flux may be reversed, entering the rotor core across the radial air gap 44 and through the peripheral surface 36 and exiting through the thrust face 34 and across the axial air gap 42. The magnetic flux across the axial air gap 42 provides the electromagnetic thrust force between the stator core 26 and the rotor core 20 that supports the axial or thrust loads to be carried by the magnetic thrust bearing 10.

As may be understood, the available electromagnetic thrust force for a magnetic thrust bearing is a function of the magnetic stresses and the active axial air gap area, which is the area of the active portion of the axial air gap. The active portion of the axial air gap corresponds to the portion of the axial air gap over which the axially-facing pole surface, or surfaces, of the stator core and the axial thrust face of the rotor core mutually coextend. In particular, the active portion of the axial air gap corresponds to the portion of the axial air gap that is mutually bounded by both the stator core pole surface, or surfaces, and the axial thrust face of the rotor core. To increase the available electromagnetic thrust force, a larger stator coil may be used to increase the magnetic stress or the active axial air gap area may be increased. However, tip speed limitations may limit the maximum allowable radius or outer diameter for the magnetic thrust bearing rotor core.

In the magnetic thrust bearing 10, the active axial air gap area corresponds to that portion of the axial air gap 42 over which the first pole surface 38 of the stator core 26 and the thrust face 34 both extend. As shown in FIG. 1, the first pole surface 38 of the stator core 26 is substantially radially coextensive with the thrust face 34 on the rotor core 20 such that the active portion of the axial air gap 42 for the illustrated magnetic bearing 10 generally corresponds to and extends over substantially the entire thrust face 34. In particular, the magnetic thrust bearing 10 provides an active portion of the axial air gap that radially extends over substantially the entire thrust face 34, from an outer surface 50 of the non-magnetic element 22 to a peripheral edge 56 of the thrust face 34, such that an electromagnetic thrust force is developed over substantially the entire axial air gap 42 and over substantially the entire thrust face 34. In some examples, such as is shown in FIG. 1, the magnetic thrust bearing 10 may provide and/or utilize the maximum available active portion of the axial air gap 42 for a particular rotor core 20.

In addition to the magnetic thrust bearing 10 utilizing a large portion of, or even substantially the entire, axial air gap 42 to develop an electromagnetic thrust force, the presence of the non-magnetic element 22 may also increase the magnetic flux concentration within the axial air gap 42. In particular, the non-magnetic element 22 radially spaces or separates the thrust face 34, the axial air gap 42 and the stator core 26 from the exterior surface 48 of the shaft 14, which may reduce or even prevent magnetic flux leakage through the shaft. As may be understood, reducing or even preventing magnetic flux leakage through the shaft may limit or even prevent any reductions of the magnetic flux concentration in the axial air gap 42 that might otherwise result from magnetic flux leakage through the shaft.

In some examples, the magnetic thrust bearing 10, with its non-magnetic element that radially spaces the axial air gap from the exterior surface of the shaft and its active axial air gap area that corresponds to substantially the entire axial air gap, may provide thrust-force to tip-speed ratios greater than about five newtons per meter per second (greater than about 5 N/m/s), with the provided thrust-force to tip-speed ratios being optionally constant or proportional to rotational speed. Such thrust-force to tip-speed ratios may be useful in applications with high static axial thrust forces and/or in high speed applications, where the tip speed may limit the outer diameter of the rotor core 20 and correspondingly limit the thrust face area available for the axial air gap 42. Such high speed applications may involve rotor core tip speeds in excess of about 200 meters per second (200 m/s), which may correspond, depending on the particular application and/or machine size, to rotational speeds in excess of about 20,000 RPM, in excess of about 40,000 RPM, in excess of about 60,000 RPM, or even in excess of about 80,000 RPM.

As may be understood, the magnetic thrust bearing 10 may provide scalable thrust forces without changing the outer diameter of the rotor core 20, or even increased thrust forces for a given example or size rotor core 20, because the magnetic thrust bearing 10 does not impose any limits on the axial length or diameter of the stator 24. In particular, the axial length and/or the outer diameter of the stator core 26 may be increased for use with a correspondingly larger coil 28 to provide higher magnetic flux densities because the magnetic thrust bearing 10 only needs to have the first pole surface 38 of the stator core 26 aligned with the thrust face 34 and the second pole surface 40 of the stator core 26 aligned with the peripheral surface 36.

In some examples, the axial and radial air gaps 42, 44 may be axially and/or radially spaced apart, which may reduce magnetic flux leakage between the axial and radial air gaps. For example, as shown in FIG. 1, where the peripheral edge 56 of the thrust face 34 is radially aligned with the peripheral surface 36 of the rotor core 20, the axial and radial air gaps 42, 44 are axially spaced apart. In some examples, the axial and radial air gaps 42, 44 may additionally or alternatively be radially spaced apart.

In some examples, the stator 24 of the magnetic thrust bearing 10 may include at least one eddy current coil 58 to provide electrodynamic damping. As may be understood, such electrodynamic damping may be used to assist with the dynamic response of the rotating machine's radial bearings, which handle the radial loads within the rotating machine 12. In particular, the eddy current coil 58 may assist with and/or provide electrodynamic radial damping and/or radial stiffness by producing a back-EMF to urge the shaft 14 back towards its nominal center position.

As may be understood, the magnetic thrust bearing 10 may include and/or be controlled by a suitable control system. By way of a nonexclusive illustrative example, such a suitable control system may include one or more axial position sensors and a suitable control circuit or controller, which may be or include a closed loop feedback control circuit or controller. The axial position sensors may be configured to sense the axial position of the shaft 14, the rotor core 20 and/or the non-magnetic element 22 and provide axial position information to the controller. Based on the axial position information from the axial position sensors, the controller may adjust, vary or control the power or current applied to the coil 28 of the stator 26 so as to maintain a substantially constant axial air gap 42 between the first pole surface 38 of the stator core 26 and the thrust face 34 of the rotor core 20 by adjusting the magnetic flux through the stator core 26, across the axial and radial air gaps 42, 44 and/or through the rotor core 22.

In some examples, magnetic thrust bearing 10 may include at least one speed sensor, which may be used by the control system to sense the rotational speed of the shaft 14 and/or the rotor core 22. The control system may use the rotational speed information to calculate and/or predict thrust loadings on the shaft and/or to control the thrust forces provided by the magnetic thrust bearing.

As shown FIG. 1, the magnetic thrust bearing 10 may omit or lack any permanent magnet (PM) bias. As may be understood, a magnetic thrust bearing without a PM bias relies on electromagnetic control such that the magnetic thrust force produced by the magnetic thrust bearing may be controllable over its full range of magnitude and/or be controlled independently of rotor speed.

In some examples, the stator core may be fabricated from a plurality of components that are mated or joined together, such as after the coil has been installed within the stator core. For example, as suggested in FIG. 1, the stator core 26 may include a circumferentially extending or circumferential piece 60 and one or more end caps 62, 64 that are connected to the circumferential piece 60 at one or more corresponding joints 66, 68. Although shown with two optional separate end caps 62, 64, some examples may include only one separate end cap, which may optionally be either of the illustrated end caps 62, 64. The end cap or end cap(s) may be installed, joined or secured to the circumferential piece, or other part of the stator core, using any suitable method, such as press-fitting or adhesive bonding of the mating components. In some examples, one or more of the end cap or end cap(s) may optionally be removable, such as to permit access to, removal of, and/or replacement of the coil.

Figure 3:
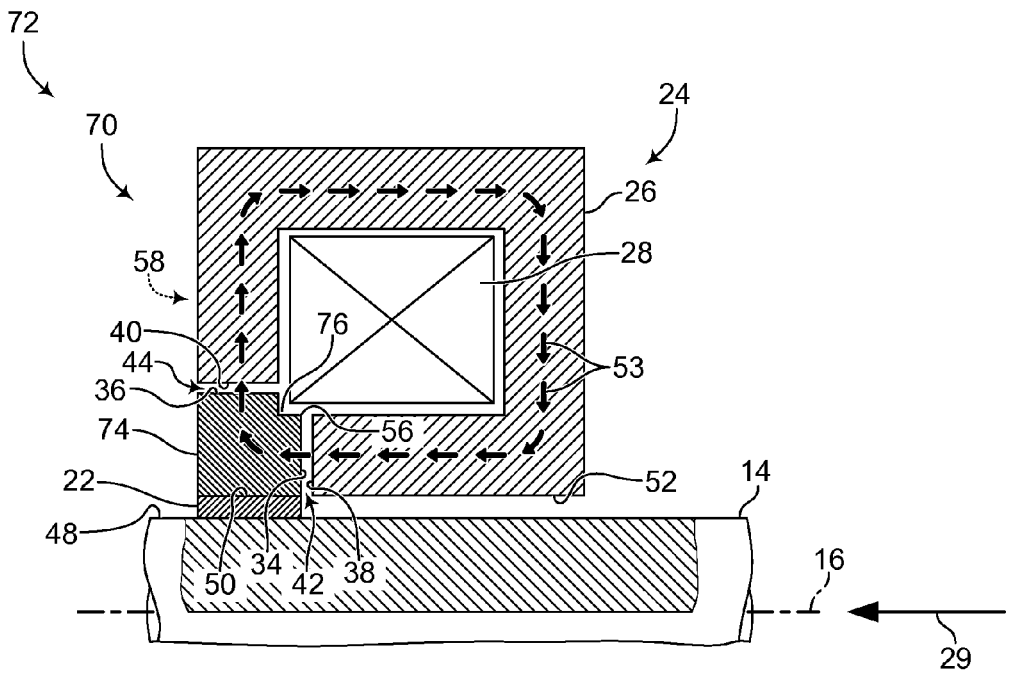
FIG. 3 is a longitudinal axial section view of another nonexclusive illustrative example of a magnetic thrust bearing for a rotating machine.

Another nonexclusive illustrative example of a magnetic thrust bearing 70 for a rotating machine 72 having a shaft 14 extending along an axis 16 is shown in FIG. 3. Unless otherwise specified, the magnetic thrust bearing 70 may, but is not required to, contain at least one of the structures, components, functionalities, and/or variations described, illustrated, and/or incorporated herein. In the illustrated example, the magnetic thrust bearing 70 includes a rotor core 74, a non-magnetic element 22, and a stator 24 comprising a stator core 26 and a coil 28.

As shown in FIG. 3, the rotor core 74 is of a stepped-cylindrical configuration with a notch 76 separating the axial and radial air gaps 42, 44. In addition to axially spacing apart the axial and radial air gaps 42, 44, the notch 76 radially spaces apart the axial and radial air gaps 42, 44 such that the peripheral surface 36 of the rotor core 74 is disposed radially outward from the peripheral edge 56 of the thrust face 34.

Figure 4:
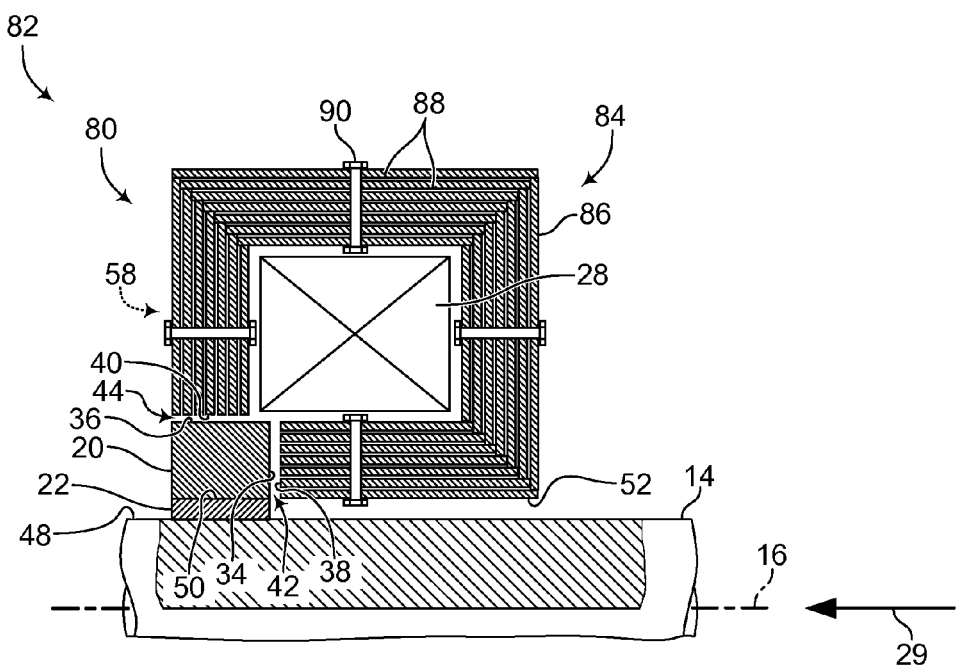
FIG. 4 is a longitudinal axial section view of another nonexclusive illustrative example of a magnetic thrust bearing for a rotating machine.

Another nonexclusive illustrative example of a magnetic thrust bearing 80 for a rotating machine 82 having a shaft 14 extending along an axis 16 is shown in FIG. 4. Unless otherwise specified, the magnetic thrust bearing 80 may, but is not required to, contain at least one of the structures, components, functionalities, and/or variations described, illustrated, and/or incorporated herein. In the illustrated example, the magnetic thrust bearing 10 includes a solid rotor core 20, a non-magnetic element 22, and a stator 84 comprising a laminated stator core 86 and a coil 28. Although the magnetic thrust bearing 80 includes a solid rotor core 20, it is within the scope of this disclosure for the rotor core to also be of a laminated construction.

The laminated stator core 86 provides a nonexclusive illustrative example of a suitable lamination configuration for a magnetic thrust bearing rotor core. As shown in FIG. 4, the laminated stator core 86 may include a plurality of laminations 88, which may be secured together using suitable fasteners 90. The laminated stator core 86 may reduce eddy current losses that may be induced within the stator laminations due to dynamic loads on the magnetic thrust bearing 80, which may provide a different current stiffness for static and dynamic loads.

Figure 5:
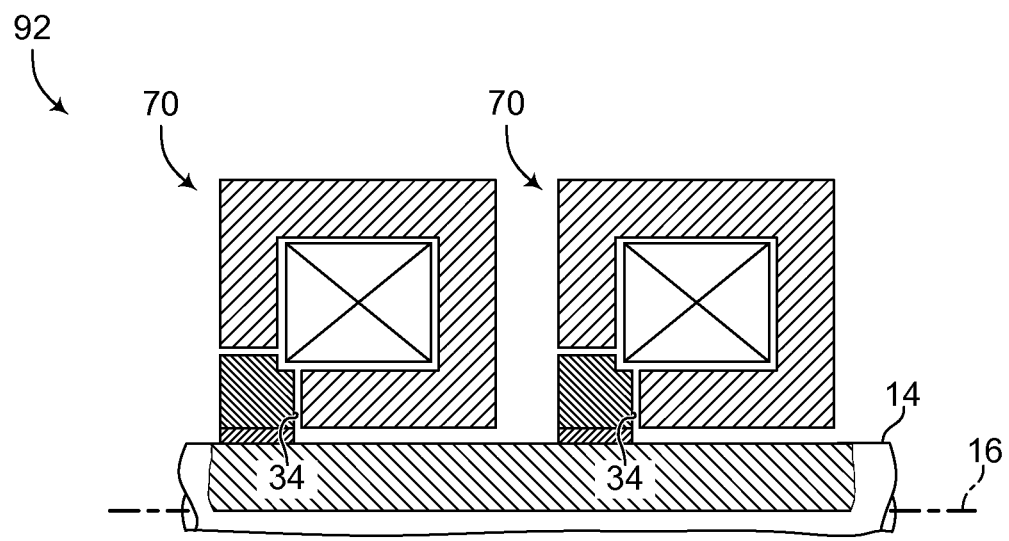
FIG. 5 is a longitudinal axial section view of a nonexclusive illustrative example of a magnetic thrust bearing arrangement that includes two examples of the magnetic thrust bearing of FIG. 3, with both oriented in the same direction.
Figure 6:
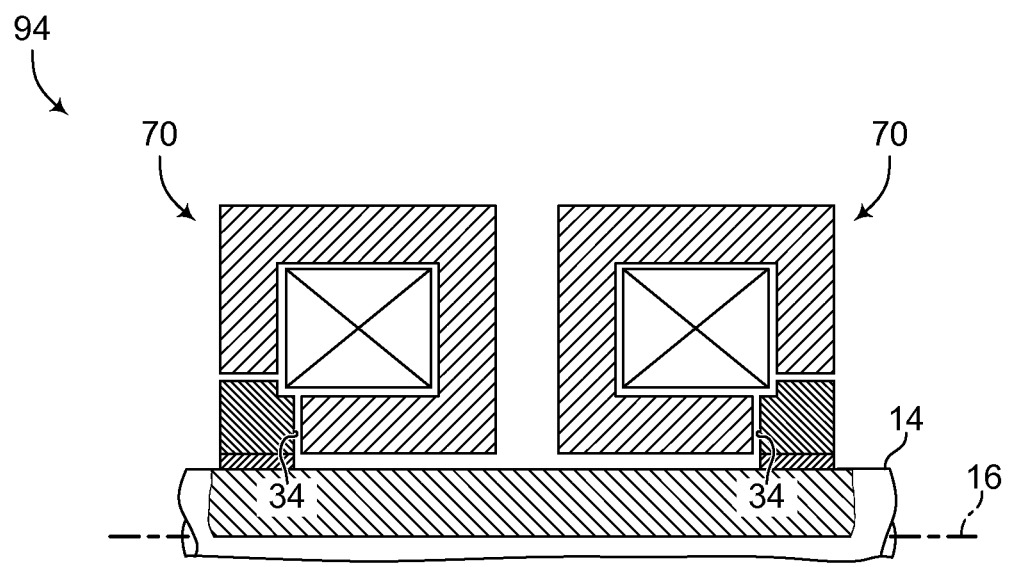
FIG. 6 is a longitudinal axial section view of a nonexclusive illustrative example of a magnetic thrust bearing arrangement that includes two examples of the magnetic thrust bearing of FIG. 3 that are oriented in opposite directions.

Nonexclusive illustrative examples of magnetic thrust bearing arrangements 92, 94 for rotating machines, which may include at least two magnetic thrust bearing units or modules configured to axially support the shaft 14, are shown in FIGS. 5 and 6. Although illustrated in FIGS. 5 and 6 with the plural instances of the magnetic thrust bearing 70 of FIG. 3, it should be understood that any suitable combination of the various magnetic thrust bearings disclosed herein may be combined together into a magnetic thrust bearing arrangement, including combinations of like types as well as combinations of different types. As may be understood, the individual magnetic thrust bearing units or modules within a given magnetic thrust bearing arrangement may be suitably arranged, distributed and or positioned relative to the particular rotating machine, such as along the axis 16 thereof, which may allow for even distribution and/or dissipation of the heat generated by the magnetic thrust bearings.

A nonexclusive illustrative example of a magnetic thrust bearing arrangement for a rotating machine is shown generally at 92 in FIG. 5. Unless otherwise specified, the magnetic thrust bearing arrangement 92 may, but is not required to, contain at least one of the structures, components, functionalities, and/or variations described, illustrated, and/or incorporated herein. In the illustrated example, the magnetic thrust bearing arrangement 92 includes two magnetic thrust bearings 70 arranged in a cascade or additive configuration, with both bearings having the thrust faces 34 of their respective rotor cores oriented to face in the same direction. As may be understood, such a cascade arrangement of magnetic thrust bearings may be useful in applications having relatively large static load due to the additive combination of the two magnetic thrust bearings 70.

Another nonexclusive illustrative example of a magnetic thrust bearing arrangement for a rotating machine is shown generally at 94 in FIG. 6. Unless otherwise specified, the magnetic thrust bearing arrangement 94 may, but is not required to, contain at least one of the structures, components, functionalities, and/or variations described, illustrated, and/or incorporated herein. In the illustrated example, the magnetic thrust bearing arrangement 94 includes two magnetic thrust bearings 70 arranged in an opposed or back-to-back configuration, with the thrust faces 34 of their respective rotor cores being oriented to face in opposite directions. As may be understood, such a back-to-back arrangement of magnetic thrust bearings may be useful in applications where dynamic thrust loads are to be compensated for and/or supported.

As may be understood, the particular combination, arrangement and orientation of magnetic thrust bearings into a magnetic thrust bearing arrangement may be selected based on the expected combination of static and dynamic loads. For example, if a particular rotating machine has a relatively large static load and a relatively small dynamic load, such as for a compressor, one or more magnetic thrust bearings in a cascaded arrangement may be used to develop and/or support the static thrust force, and one or more back-to-back pairs of magnetic thrust bearings may be used to develop and/or compensate for dynamic thrust loads. In such an example, the back-to-back pairs of magnetic thrust bearings may sustain the dynamic load-induced eddy current losses, while the cascaded magnetic thrust bearings that are developing and/or supporting the major part of static thrust force may have a relatively constant magnetic flux such that the core losses within those magnetic thrust bearings may be relatively small.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a," "a first" or "the" element, or the equivalent thereof, should be understood to include incorporation of one or more such elements, neither requiring nor excluding two or more such elements, unless the context clearly indicates otherwise. As used herein, the terms "having", "containing", "including", "comprising" and the like are open ended terms that indicate the presence of stated elements or features, but do not preclude additional elements or features.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A magnetic thrust bearing for a rotating machine having a shaft extending along an axis, the magnetic thrust bearing comprising:
 a rotor core configured to extend coaxially around the shaft, the rotor core having a substantially radially extending thrust face and a substantially axially extending peripheral surface;
 a non-magnetic element configured to be coaxially disposed on the shaft, wherein the non-magnetic element radially spaces the thrust face from the shaft; and
 a stator comprising a stator core and a coil both configured to extend coaxially around the axis, wherein the stator core comprises a substantially radially extending first pole surface and a substantially axially extending second pole surface, the first pole surface defines an axial air gap with the thrust face, and the second pole surface defines a radial air gap with the peripheral surface.

2. The magnetic thrust bearing of claim 1, wherein the thrust face is perpendicular to the axis.

3. The magnetic thrust bearing of claim 1, wherein the peripheral surface extends parallel to the axis.

4. The magnetic thrust bearing of claim 1, wherein the axial and radial air gaps are radially spaced apart.

5. The magnetic thrust bearing of claim 1, wherein the axial and radial air gaps are axially spaced apart.

6. The magnetic thrust bearing of claim 1, wherein the axial air gap radially extends from an outer surface of the non-magnetic element to a peripheral edge of the thrust face.

7. The magnetic thrust bearing of claim 6, wherein the peripheral edge of the thrust face is radially aligned with the peripheral surface of the rotor core.

8. The magnetic thrust bearing of claim 6, wherein the peripheral surface of the rotor core is disposed radially outward from the peripheral edge of the thrust face.

9. The magnetic thrust bearing of claim 1, wherein the non-magnetic element is configured to radially space the rotor core from an exterior surface of the shaft.

10. The magnetic thrust bearing of claim 9, wherein the non-magnetic element comprises an axially extending outer surface and the stator core comprises an axially extending inner surface that is substantially radially aligned with the outer surface of the non-magnetic element.

11. The magnetic thrust bearing of claim 1, wherein at least one of the rotor core and the stator comprises an annular structure configured to extend substantially completely circumferentially around the axis.

12. The magnetic thrust bearing of claim 1 incorporated into a rotating machine, the rotating machine comprising:
   the shaft; and
   at least one magnetic thrust bearing of claim 1 configured to axially support the shaft, wherein the rotor core extends coaxially around the shaft, the non-magnetic element is coaxially disposed on the shaft, and the stator core and the coil both extend coaxially around the shaft.

13. The rotating machine of claim 12, comprising at least two magnetic thrust bearings of claim 1 configured to axially support the shaft, wherein the thrust faces of the rotor cores of the at least two magnetic thrust bearings are oriented in the same direction.

14. The rotating machine of claim 12, comprising two magnetic thrust bearings of claim 1 configured to axially support the shaft, wherein the thrust faces of the rotor cores of the two magnetic thrust bearings are oriented in opposite directions.

15. A rotating machine, comprising:
   a shaft having an exterior surface;
   a magnetic thrust bearing rotor core extending coaxially around the shaft, the magnetic thrust bearing rotor core having a radially extending thrust face and an axially extending peripheral surface;
   a magnetic thrust bearing stator comprising a coil and a stator core that both extend coaxially around the shaft, wherein the stator core comprises a radially extending pole surface and an axially extending pole surface, the radially extending pole surface defining an axial air gap with the thrust face, and the axially extending pole surface defining a radial air gap with the peripheral surface; and
   a non-magnetic element disposed around the exterior surface of the shaft, wherein the non-magnetic element radially spaces the axial air gap from the exterior surface of the shaft.

16. The rotating machine of claim 15, wherein the non-magnetic element radially spaces the magnetic thrust bearing rotor core from the exterior surface of the shaft.

17. The rotating machine of claim 16, wherein the non-magnetic element comprises an axially extending outer surface and the stator core comprises an axially extending inner surface that is substantially radially aligned with the outer surface of the non-magnetic element.

18. The rotating machine of claim 15, wherein the axial and radial air gaps are spaced apart at least one of axially and radially.

19. The rotating machine of claim 15, wherein the axial air gap radially extends from an outer surface of the non-magnetic element to a peripheral edge of the thrust face.

20. The rotating machine of claim 19 wherein the peripheral edge of the thrust face is radially aligned with the peripheral surface of the rotor core.

\* \* \* \* \*